Patented Apr. 25, 1944

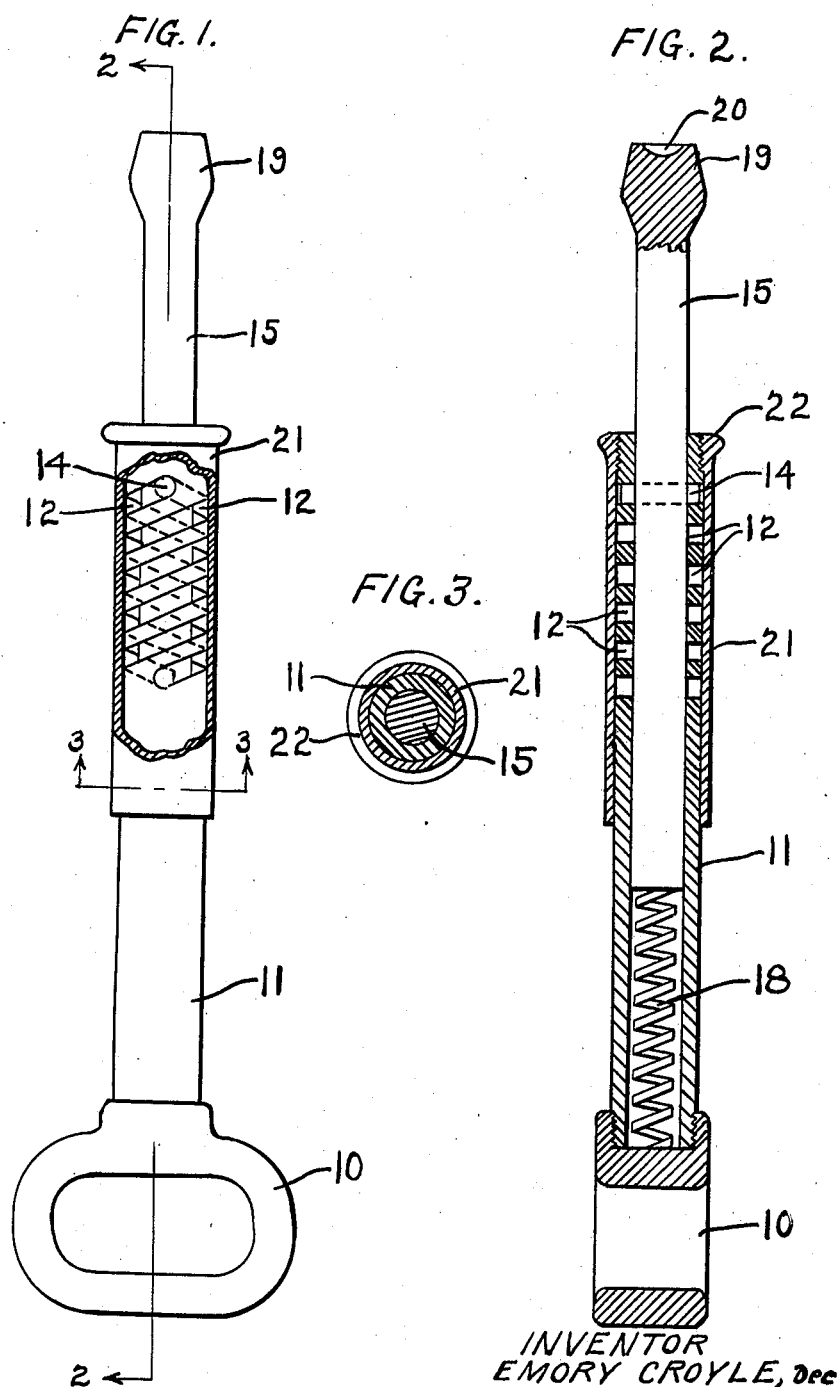

2,347,399

UNITED STATES PATENT OFFICE 2,347,399

RIVET HOLDER OR DOLLY BAR

Emory Croyle, deceased, late of Altoona, Pa., by Eva I. Croyle, administratrix, Altoona, Pa.

Application January 15, 1943, Serial No. 472,522

6 Claims. (Cl. 78—53.5)

This invention relates to riveting tools and more particularly to portable rivet holders, commonly referred to as dolly bars, anvils or bucker-ups, for holding the head end of a rivet in position while the other end is peened over by a pneumatic hammer.

An object of the invention is to provide a rivet heldor having a resilient means that will absorb the shocks incidental to the riveting operation and thus relieve the operator from undue fatigue.

Another object of the invention is to provide means for rotating the anvil head or rivet set of the rivet holder on the head of the rivet with a positive pressure while it is being driven to assure tight and perfectly driven rivets.

These and other objects of the invention will become apparent from the following description and the accompanying drawing, wherein, Figure 1 is a front elevation, partly in section, of a preferred form of the invention, Figure 2 is a longitudinal side section taken on lines 2—2 of Fig. 1, and Figure 3 is a cross sectional view taken on line 3—3 of Fig. 1.

Referring now to the drawing wherein like reference numerals indicate the same parts throughout the several views, 10 designates a handle in which is threaded a tubular member 11. Cut through opposite walls of the tubular member 11 are two helical tracks 12—12 in which ride the end portions of a pin 14. The pin 14 projects beyond either side of a rotatable plunger 15 in which it is secured. This rotatable plunger 15 is disposed within a casing or tubular member 11 and is normally maintained in its outermost position by a coil spring 18 housed within the lower part of the tubular member.

Carried on the outer end of the rotatable plunger 15 is a rivet set or anvil 19 having a cup shaped concavity 20 which fits over the head of the rivet to be set. The rivet set or anvil can be removably attached to the end of the rotatable plunger in any suitable manner so that different sizes and shapes of rivet sets may be used interchangeably.

A sleeve 21 fits over the upper half of the tubular member 11 and is threaded thereto at 22. This sleeve provides a hand grip for the operator in using the tool.

In the operation of heading rivets the handle 10 of the tool is grasped in one hand and the sleeve 21 thereof in the other hand of the operator who brings the rivet set or anvil 19 into engagement with the head of the rivet to be driven. A pneumatic hammer transmits blows to the other end of the rivet and these rapid shocks are absorbed by the rivet set 19. The weight of the operator against the handle 10 forces the plunger 15 of the tool back toward the handle against the compression of the spring 18. As the plunger 15 moves backward the pin 14 secured thereto rides in the helical tracks 12—12 of the stationary tube 11 and thus imparts rotary motion to the plunger and to the rivet set or anvil 19 carried thereby.

This spinning and compressive action of the anvil 19 on the head of the rivet along with the vibrations caused by the pneumatic hammer forces the rivet head firmly into a tight position and prevents "backing" or loosening of the rivet.

Thus this improved rivet holder through the spring 18 absorbs the heavy blows of the riveting hammer and relieves the operator from injurious strain. Such relief permits the operator to keep the reciprocating and rotating rivet set 19 in continuous contact with the head of each rivet being driven so that all riveting operations are perfectly and uniformly completed.

In riveting operations with an ordinary dolly bar the blows from the pneumatic hammer drives the bar away from the rivet head and other blows from the hammer hit the rivet before the dolly bar can be brought back into engagement with the rivet head with the result that in many instances the rivet is knocked out of alignment and the head of the driven rivet is not flush with the surface of the material being riveted. Such defective riveting is eliminated by the use of the improved dolly bar shown in the drawing because the rotating rivet set 19, through the rebound of the spring 18, strikes a series of uniform blows over all areas of the head of the rivet to force it into accurate and complete flush engagement with the riveted material.

It is to be understood that although a single embodiment of the invention has been shown in the drawing and described in the foregoing paragraphs, the invention is not limited to that embodiment but is capable of modification and substitution of parts and general reorganization within the scope of the appended claims.

What is claimed is:

1. In a dolly for use in riveting operations, a member for engaging the head end of a rivet, and means for rotating the rivet engaging member while the other end of the rivet is being peened over.

2. In a bucking-up tool for use in riveting operations, an anvil for engaging the head of a rivet, resilient means for normally maintaining the anvil in its outermost position for absorbing blows of the riveting operation, and means for rotating the anvil when it is reciprocated by the riveting blows.

3. In a dolly for use in riveting operations, a rivet set, a spring for absorbing shocks transmitted to the rivet set, and means for rotating the rivet set when it is reciprocated by the riveting operation.

4. In a dolly for use in riveting operations, a rivet set for engaging the head of a rivet, a spring for normally maintaining the rivet set in its outermost position, a sleeve for holding the spring in place and having a helical track, and a pin carried by the rivet set and inserted in the said track to cause rotation of the rivet set when it is forced against the compression of the spring by a riveting blow transmitted to the other end of the rivet.

5. In a dolly for use in riveting operations, a handle, a tubular member secured to the handle and having a plurality of helical tracks, a plunger positioned in the tubular member, a spring behind the plunger, a pin secured in the plunger and protruding from both sides thereof, said protruding ends of the pin being positioned in the helical tracks of the tubular member.

6. A dolly for use in riveting operations including a handle, a casing attached to the handle, a rotatable plunger yieldingly carried in the casing for absorbing shocks, a rivet holder extending from the plunger, and means for rotating the plunger and the rivet holder during the riveting operation.

EVA I. CROYLE,
*Administratrix of the Estate of Emory Croyle, Deceased.*